United States Patent
Ichikawa

(10) Patent No.: US 12,503,009 B2
(45) Date of Patent: Dec. 23, 2025

(54) VEHICLE

(71) Applicant: TOYOTA JIDOSHA KABUSHIKI KAISHA, Toyota (JP)

(72) Inventor: Shinji Ichikawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/795,334

(22) Filed: Aug. 6, 2024

(65) Prior Publication Data
US 2025/0145053 A1    May 8, 2025

(30) Foreign Application Priority Data
Nov. 14, 2023   (JP) ................. 2023-193508

(51) Int. Cl.
| | | |
|---|---|---|
| B60L 50/60 | (2019.01) | |
| B60L 58/20 | (2019.01) | |
| B60L 58/21 | (2019.01) | |
| H01M 10/42 | (2006.01) | |
| H01M 50/249 | (2021.01) | |

(52) U.S. Cl.
CPC ............... B60L 58/20 (2019.02); B60L 50/60 (2019.02); H01M 10/425 (2013.01); H01M 50/249 (2021.01); *H01M 2220/20* (2013.01)

(58) Field of Classification Search
CPC ...... B60L 58/20; B60L 50/60; H01M 60/249; H01M 10/425; H01M 2220/20
USPC ........................................... 307/9.1
See application file for complete search history.

(56) References Cited

U.S. PATENT DOCUMENTS

| | | | | |
|---|---|---|---|---|
| 2021/0339648 A1* | 11/2021 | Koga | ................. | B65F 3/02 |
| 2024/0262246 A1* | 8/2024 | Kikuchi | ................. | H02J 7/0063 |

FOREIGN PATENT DOCUMENTS

JP    2022-174873 A    11/2022

* cited by examiner

*Primary Examiner* — Rexford N Barnie
*Assistant Examiner* — Swarna N Chowdhuri
(74) *Attorney, Agent, or Firm* — SoraIP, Inc.

(57) ABSTRACT

The vehicle includes an object device and a first power storage device and a second power storage device that can be connected in parallel to the object device. The first power storage device includes a first battery. The second power storage device includes a second battery. When a voltage difference between a voltage of the first battery and a voltage of the second battery is greater than a reference value, at least one of the first battery and the second battery is not connected to the object device.

5 Claims, 6 Drawing Sheets

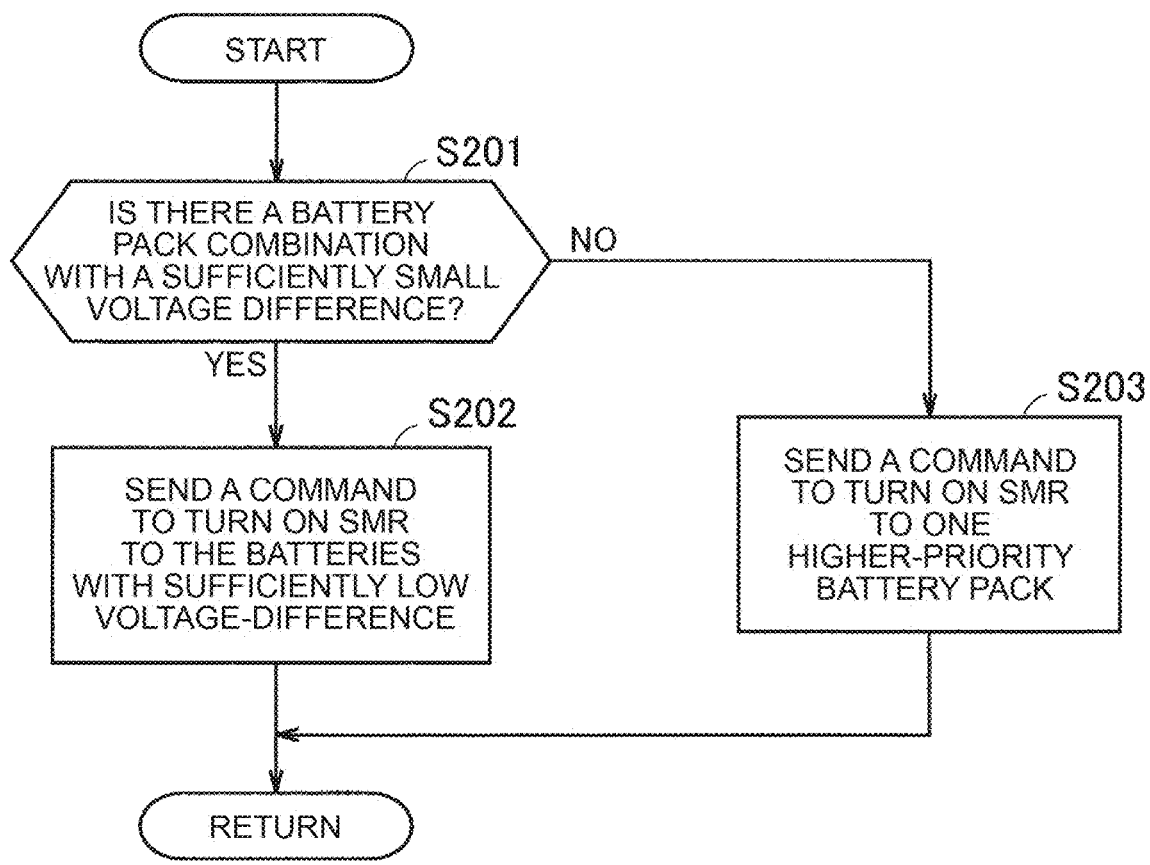

VEHICLE

CROSS-REFERENCE TO RELATED APPLICATION

This application claims priority to Japanese Patent Application No. 2023-193508 filed on Nov. 14, 2023, incorporated herein by reference in its entirety.

BACKGROUND

1. Technical Field

The present disclosure relates to a vehicle including a plurality of power storage devices.

2. Description of Related Art

Japanese Unexamined Patent Application Publication No. 2022-174873 (JP 2022-174873 A) discloses a vehicle equipped with a plurality of replaceable batteries.

SUMMARY

In the vehicle described in JP 2022-174873 A, a battery is individually provided for each of four motor control units. That is to say, one battery is provided for one object device (e.g., a motor control unit) installed in the vehicle. However, it is also conceivable to connect a plurality of batteries in parallel to one object device, for the purpose of supplying a large amount of power to the object device, or the like. However, when multiple batteries are connected to one object device, there is a possibility that a malfunction will occur in the vehicle, depending on the state of the batteries. For example, the object device may be damaged.

The present disclosure has been made in order to solve the above-described problem, and an object thereof is to suppress occurrence of a malfunction in a vehicle due to multiple batteries installed in the vehicle.

A vehicle according to an embodiment of the present disclosure includes an object device, and a first power storage device and a second power storage device that are connectable in parallel to the object device.
The first power storage device includes a first battery.
The second power storage device includes a second battery. When a voltage difference between a voltage of the first battery and a voltage of the second battery is greater than a reference value, at least one of the first battery and the second battery is not connected to the object device.

According to the present disclosure, occurrence of a malfunction in a vehicle due to multiple batteries installed in the vehicle can be suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6 is a flowchart illustrating a modification of a method of selecting a battery to be connected to an object device.

DETAILED DESCRIPTION OF EMBODIMENTS

Figure 1:
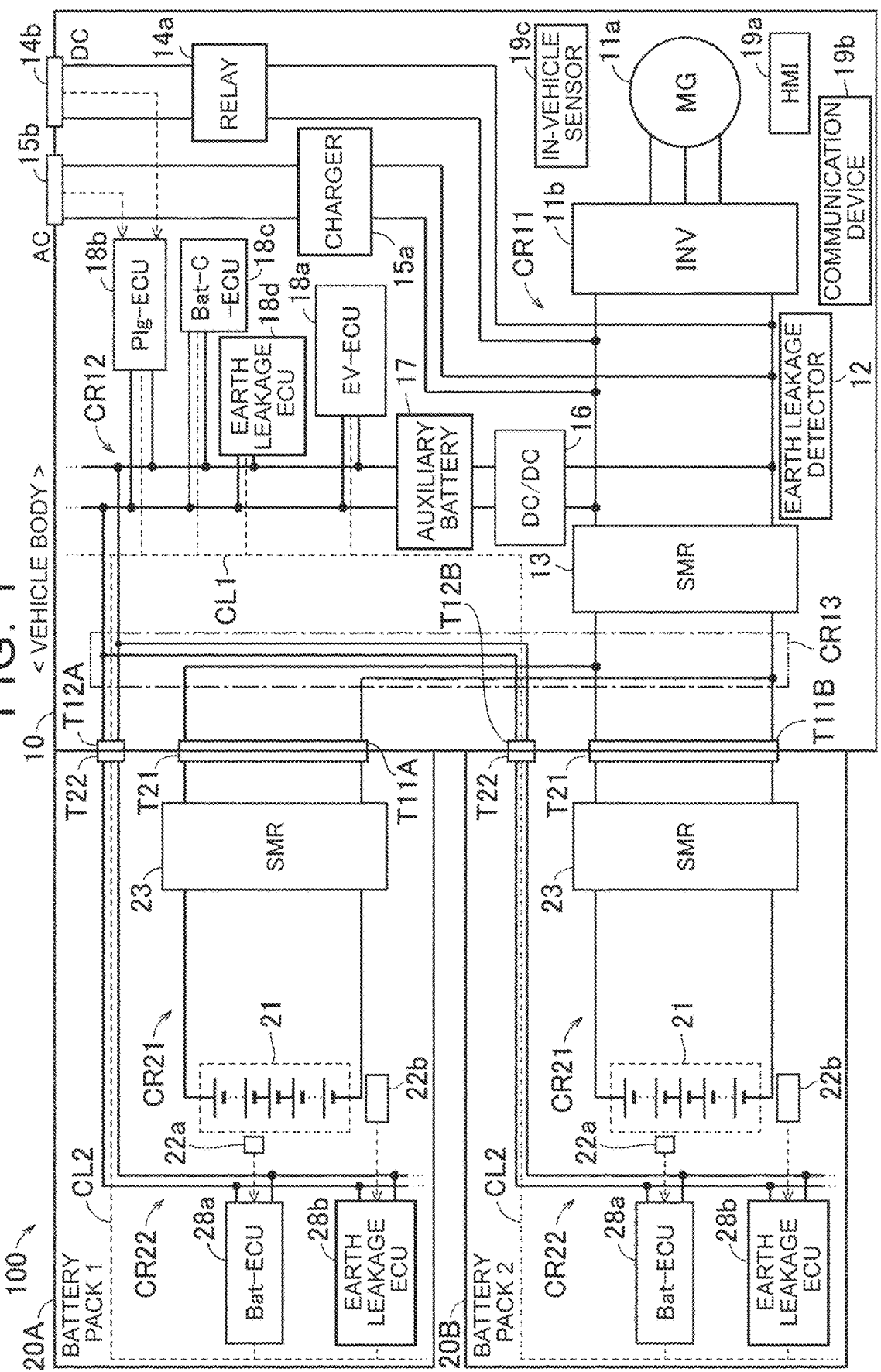
FIG. 1 is a diagram illustrating a configuration of a vehicle according to an embodiment of the present disclosure.

An embodiment of the present disclosure will be described in detail with reference to the drawings. The same or corresponding parts in the drawings are designated by the same reference signs and repetitive description will be omitted.

FIG. 1 is a diagram illustrating a configuration of a vehicle according to this embodiment. Referring to FIG. 1, a vehicle 100 includes a vehicle body 10, a battery pack 20A (first power storage device), and a battery pack 20B (second power storage device). The vehicle body 10 is a part of the vehicle 100 other than the battery-pack 20A, 20B. The vehicle body 10 includes a vehicle driving device. The vehicle-driving device includes a MG (Motor Generator) 11a and an inverter 11b, and corresponds to an exemplary "object device" according to the present disclosure. The vehicle driving device is configured to drive the vehicle 100 using the electric power outputted from each of the battery-pack 20A, 20B. The battery-pack 20A and 20B are configured to be connectable in parallel to the inverter 11b. The vehicles 100 are, for example, battery electric vehicle (BEV) without an internal combustion engine. However, the present disclosure is not limited thereto, and the vehicles 100 may be PHEV (plug-in hybrid electric vehicle) including an internal combustion engine, or may be other electrified vehicle (xEV). In this embodiment, since the battery pack 20A and 20B have the same configuration, they are hereinafter referred to as "battery pack 20" unless they are distinguished from each other.

The vehicle body 10 includes a circuit CR11 and a CR12. The battery-pack 20 includes a circuit CR21 and a CR22. The circuit CR12 includes an auxiliary battery 17. The circuit CR21 includes a battery 21. The battery 21 is, for example, a secondary battery such as a lithium ion battery, a nickel metal hydride battery, or a sodium ion battery. The type of the secondary battery may be a liquid secondary battery or an all-solid secondary battery. A plurality of secondary batteries may form a battery pack. The auxiliary battery 17 corresponds to a low-voltage power supply that outputs power at a voltage lower than the voltage of the battery 21. A DC/DC converter 16 is provided between the circuit CR11 and the circuit CR12.

The circuit CR11 in the vehicle body 10 includes a MG 11a, an inverter 11b, a DC charge relay 14a, a DC inlet 14b, a AC charger 15a, and a AC inlet 15b. Further, the circuit CR11 is provided with a leakage detector 12. A BMS (Battery Management System) 22a and an earth leakage detector 22b are provided in the circuit CR21 in the battery pack 20.

The vehicle body 10 further includes a terminal T11A to which the battery pack 20A can be attached and detached, a terminal T11B to which the battery pack 20B can be attached and detached, a parallel circuit CR13 that connects the terminal T11A and the terminal T11B in parallel, and a SMR 13 disposed between the parallel circuit CR13 and the vehicle drive device (inverter 11b). The circuit CR11 is connected to each of the terminals T11A, T11B via a SMR 13 and a parallel circuit CR13. Each of the battery-pack 20A, 20B includes a terminal T21 to which the vehicle body 10 is detachable, and a SMR 23 disposed between the terminal T21 and the circuit CR21. The circuit CR21 (high-voltage power supply line) is connected to the terminal T21 via a SMR 23. "SMR" means System Main Relay (System Main Relay).

The terminal T21 of the battery-pack 20A is connected to a terminal T11A (first terminal) of the vehicle body 10. In the battery pack 20A, SMR 23 (first relay) of the battery pack 20A is disposed between the terminal T21 (third terminal) and the battery 21 (first battery). The terminal T21 of the battery-pack 20B is connected to a terminal T11B (second terminal) of the vehicle body 10. In the battery pack 20B, SMR 23 (second relays) of the battery pack 20B is disposed between the terminal T21 (fourth terminal) and the battery 21 (second battery). The relays allow the connection/disconnection between the object device (inverter 11b) and each of the first battery and the second battery to be easily and appropriately switched.

The vehicle body 10 further includes a terminal T12A to which the battery pack 20A is detachable, and a terminal T12B to which the battery pack 20B is detachable. A circuit CR12 (low-voltage power supply line) in the vehicle body 10 is connected to each of the terminals T12A, T12B via a parallel circuit CR13. The parallel-circuit CR13 connects the terminal T12A and the terminal T12B in parallel. A communication line CL1 (a broken line in FIG. 1) in the vehicle body 10 is also connected to each of the terminal T12A, T12B. Each of the battery-pack 20A, 20B further includes a terminal T22. In each of the battery-pack 20A, 20B, the circuit CR22 (low-voltage power supply line) and the communication line CL2 (broken line in FIG. 1) are connected to the terminal T22.

The auxiliary battery 17 supplies electric power for driving auxiliary machines mounted on the vehicle 100. The auxiliary battery 17 outputs DC power to the circuit CR12 (low-voltage power supply line). The circuit CR12 further includes an ECU 18a, 18b, 18c, 18d in addition to the auxiliary battery 17. The circuit CR22 further includes an ECU 28a, 28b. The auxiliary battery 17 supplies power to each of 18d, 28a, 28b from, for example, an ECU 18a connected to a low-voltage power supply line. "ECU" means an electronic control unit (Electronic Control Unit).

ECU 18a corresponds to a control device (EV-ECU) that controls various types of control related to the vehicles 100. ECU 18b corresponds to a control device (Plg-ECU) that detects the status of each of DC inlet 14b and AC inlet 15b. ECU 18c corresponds to a control device (Bat-C-ECU) that controls DC charge-relay 14a and AC charger 15a. ECU 18d corresponds to a control device (first earth leakage ECU) that monitors the earth leakage status of the circuit CR11. ECU 28a corresponds to a control device (Bat-ECU) that monitors the status of the batteries 21 and controls SMR 23. ECU 28b corresponds to a control device (second earth leakage ECU) that monitors the earth leakage status of the circuit CR21.

ECU includes a processor and a storage device. The storage device is configured to be able to save the stored information. In addition to the program, the storage device stores various kinds of information used in the program. In this embodiment, various kinds of control are executed by the processor executing a program stored in the storage device. However, these processes may be executed only by hardware (electronic circuit) without using software. 15

In the vehicle 100, ECU are communicably connected to each other via an in-vehicle network (e.g., a CAN (Controller Area Network)). ECU 18a obtains information from other ECU, controls the inverter 11b, DC/DC converters 16 and SMR 13, 23, and sends control commands to ECU 18c and ECU 28a.

The leakage detector 12 detects a leakage condition (for example, an insulating resistor) of the circuit CR11, and outputs the detected condition to ECU 18d. BMS 22a detects the condition (current, voltage, temperature, etc.) of the battery 21, and outputs the detected condition to ECU 28a. The earth leakage detector 22b detects a leakage condition of the circuit CR21, and outputs the detected condition to ECU 28b. ECU 18a acquires information indicating a battery state and a leakage state from ECU 18d, 28a, 28b.

DC/DC converters 16 transform DC power between the circuit CR11 and the circuit CR12. Specifically, DC/DC converters 16 step down the DC power from the batteries 21 and provide the DC power to the auxiliary battery 17. The capacity of the battery 21 is larger than the capacity of the auxiliary battery 17.

The battery pack 20A and 20B are attached to the vehicle body 10 by connecting the terminal T21, T22 of the battery pack 20A to the terminal T11A, T12A and connecting the terminal T21, T22 of the battery pack 20B to the terminal T11B, T12B, thereby completing the vehicle 100. In the vehicle 100, a communication line CL1 of the vehicle body 10, a communication line CL2 of the battery pack 20A, and a communication line CL2 of the battery pack 20B are connected. These communication lines constitute an in-vehicle network (e.g., a CAN) of the vehicles 100.

MG 11a functions as a driving motor. The inverter 11b functions as a PCU (Power Control Unit) for MG 11a. The inverter 11b drives MG 11a by using the electric power supplied from the batteries 21 of the respective battery packs. MG 11a converts power to torques and rotates the drive wheels of the vehicles 100. In addition, MG 11a performs regenerative power generation at the time of deceleration of the vehicles 100, for example, and charges the batteries 21.

Each of DC inlet 14b and AC inlet 15b has a terminal for detecting connection/disconnection of the charging cable (plug), and outputs a signal indicating whether or not the charging cable is connected to ECU 18b. ECU 18a acquires information indicating the inlet state from ECU 18b, and transmits a control command to ECU 18c. AC charger 15a performs AC/DC transformation. The plug-in charge of the batteries 21 is executed by cooperation of ECU 18a and 18c.

The vehicle body 10 further includes an HMI (Human Machine Interface) 19a and a communication device 19b. HMI 19a and the communication device 19b are also supplied with electric power from the auxiliary battery 17. HMI 19a includes an input device and a display device provided in the vehicle cabin. HMI 19a may include a touch panel display. The input device outputs a signal corresponding to an input from the user to ECU 18a. The communication device 19b is configured to be capable of wirelessly communicating with a server 380 (FIG. 2) described later. Various sensors (not shown) (in-vehicle sensor 19c) are also mounted on the vehicle body 10. ECU 18a is configured to acquire the detections of these sensors, either directly or via other ECU.

In this embodiment, HMI 19a includes an activation switch. In general, the activation switch is referred to as a "power switch" or an "ignition switch" or the like. The user of the vehicle 100 can activate or deactivate the control system (including ECU) of the vehicle 100 or turn the vehicle 100 Ready-ON or Ready-OFF by operating the activation switch. Each operation may be a remote operation (e.g., a request by wireless communication).

Ready-ON state is a state in which the voltage of at least one battery 21 of the battery pack 20A, 20B connected to the vehicle body 10 is applied to the circuit CR11 of the vehicle body 10. In Ready-ON state, SMR 13 is in the closed state, and at least one SMR 23 of the battery-pack 20A, 20B is also in the closed state. Then, electric power is supplied from the batteries 21 corresponding to the closed SMR 23 to the vehicle-driving devices (MG 11a and inverter 11b). Ready-OFF state is a state in which the voltage of the battery 21 is not applied to the circuit CR11. In Ready-OFF state, SMR 13 is in the open state, and no electric power is supplied to the vehicle-driven device from any of the batteries 21 in the battery-pack 20A, 20B.

Figure 2:
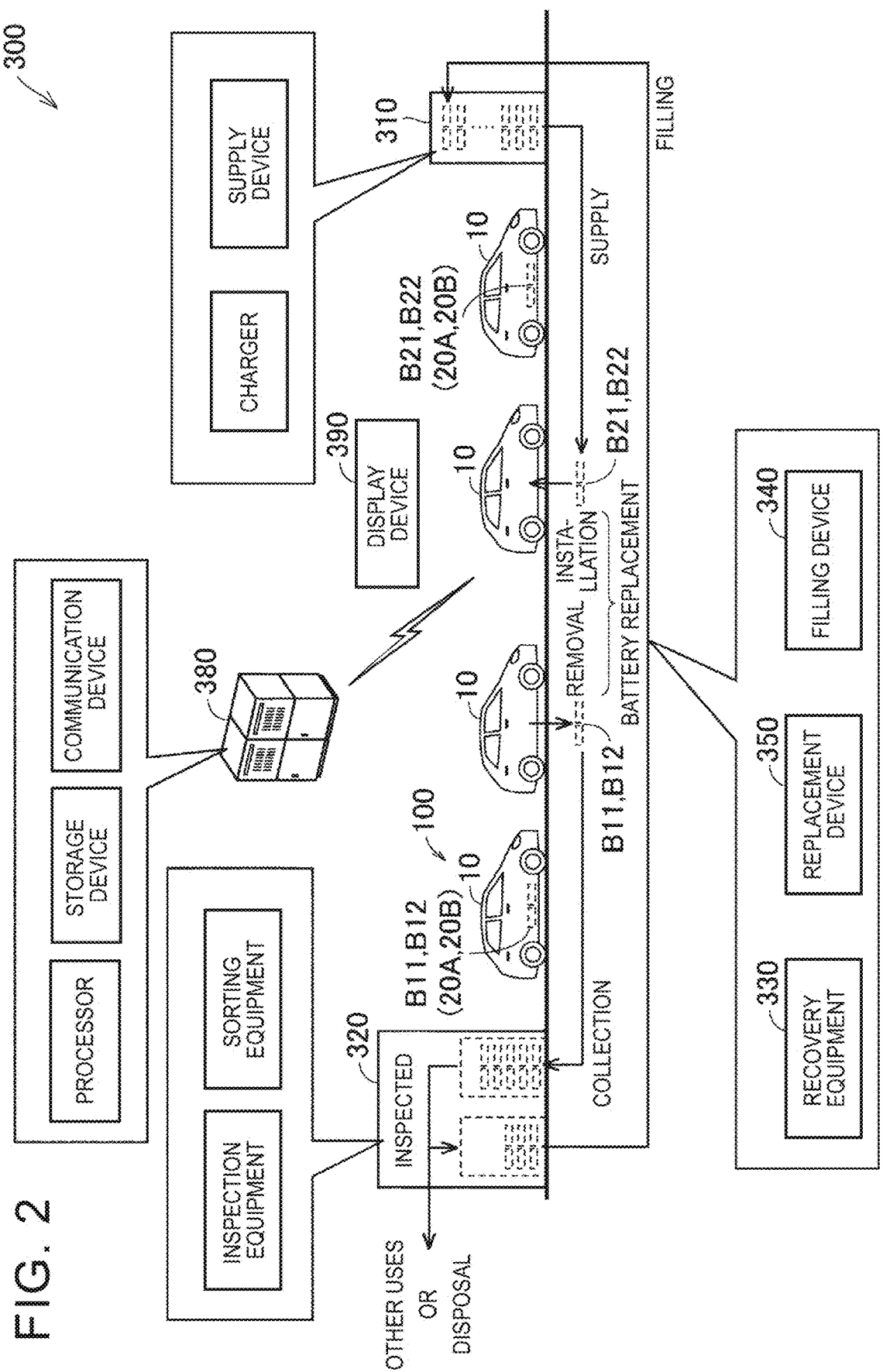
FIG. 2 is a diagram illustrating an example of a configuration of a battery replacement system for replacing a power storage device.

The battery pack 20A, 20B mounted on the vehicles 100 can be replaced with another battery pack. FIG. 2 is a diagram illustrating an example of a configuration of a battery replacement system for replacing a battery pack. The battery replacement system 300 shown in FIG. 2 is mounted, for example, in a battery replacing station.

Referring to FIG. 2, the battery replacement system 300 is configured to remove a battery pack mounted on the vehicle 100 from the vehicle body 10 and attach another battery pack to the vehicle body 10. In the following, two battery packs (battery pack 20A and 20B) are simultaneously removed from the vehicle 100, and two alternative battery packs are simultaneously attached to the vehicle 100. However, the present disclosure is not limited thereto, and the battery-pack 20A, 20B may be replaced one by one in order.

Hereinafter, the two battery packs collected from the vehicles 100 will be referred to as "battery pack B11, B12". The two battery packs attached to the vehicles 100 instead of the battery pack B11, B12 are referred to as "battery pack B21, B22". Each of the battery pack B11, B12, B21, B22 has the configuration of the battery pack shown in FIG. 1. The battery pack B21, B22 attached to the vehicle body 10 functions as a battery pack 20A, 20B (FIG. 1) in the vehicle 100.

Specifically, the battery replacement system 300 includes a first storage device 310, a second storage device 320, a recovery device 330, a filling device 340, an replacement device 350, a server 380, and a display device 390. The first storage device 310 stores a plurality of battery packs to be supplied to the vehicle. The first storage device 310 includes a charger and a supply device in addition to a pack storage unit (for example, a storage). The second storage device 320 stores a plurality of battery packs collected from a plurality of vehicles. The second storage device 320 includes an inspection device and a sorting device in addition to a pack storage unit (for example, a storage box). The server 380 includes a processor, a storage device, and a communication device, and functions as a control device. The storage device stores information (e.g., specification information) related to the respective battery packs present in the battery replacement system 300 separately by the identification information (pack ID) of the battery packs. The display device 390 displays information in accordance with an instruction from the server 380.

Figure 3:
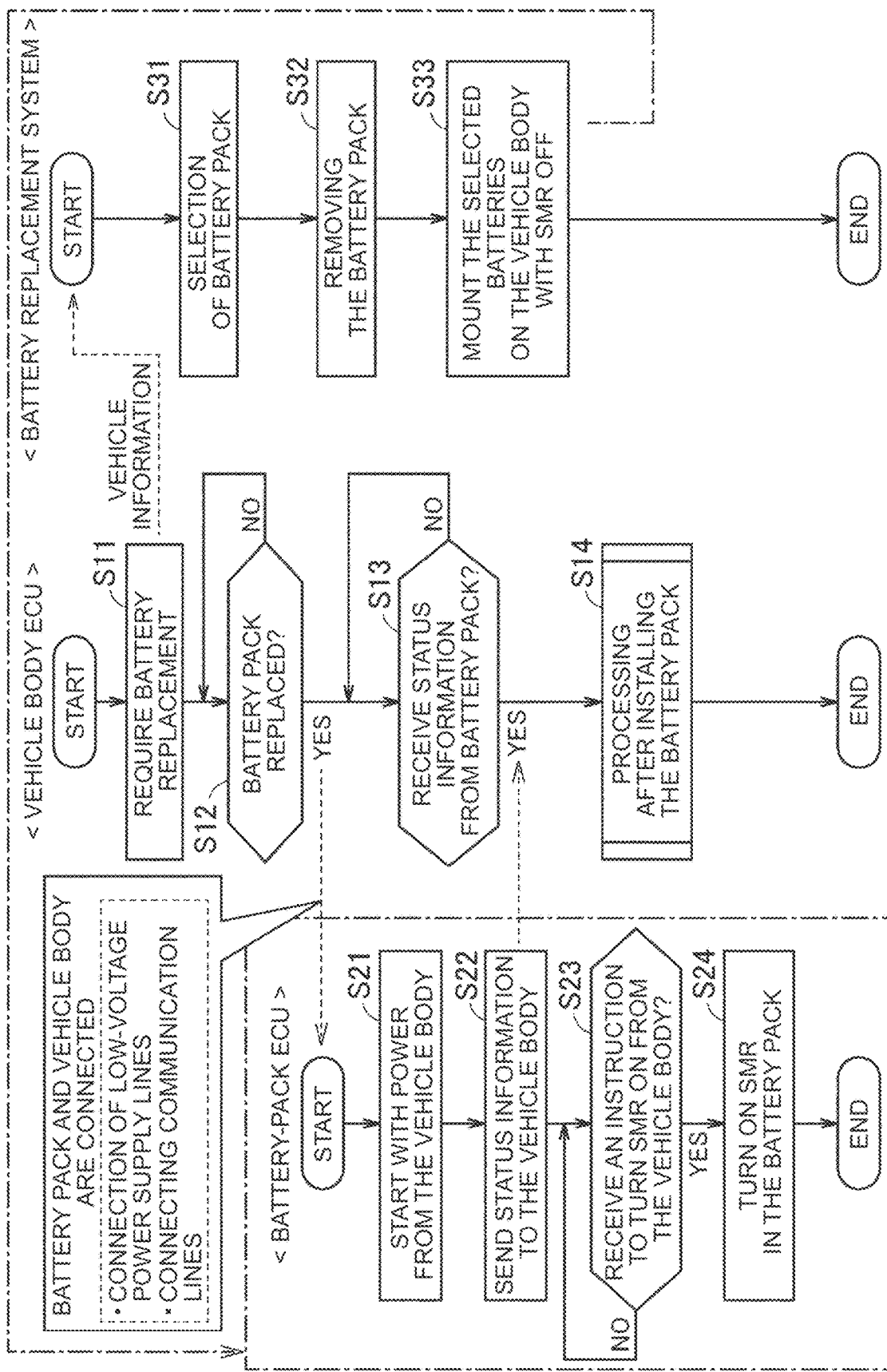
FIG. 3 is a flowchart illustrating a battery replacement method according to an embodiment of the present disclosure.

Hereinafter, a battery replacement method will be described with reference to FIGS. 1 to 3. FIG. 3 is a flowchart showing a process according to the battery replacement method according to the embodiment. For example, after the vehicles 100 are parked in a predetermined area in the battery-replacing station, ECU 18a starts S14 process from S11 shown in FIG. 3. ECU 18a may initiate the process flow in response to a request from a user terminal (e.g., an HMI 19a) of the vehicle 100. ECU 18a and the server 380 are configured to be wirelessly communicable. "S" in the flowchart means step.

Referring to FIG. 3 together with FIGS. 1 and 2, in S11, ECU 18a transmits a signal requesting replacement of a battery pack (hereinafter, referred to as "replacement request signal") to the server 380. The replacement request signal includes identification information (vehicle ID) of the vehicle 100 and specification information of battery packs (battery pack B11, B12) mounted on the vehicle 100. The replacement request signal may include the specification information of the vehicle body 10 in place of or in addition to the specification information of the battery-pack B11, B12. In the following S12, ECU 18a determines whether or not the battery-pack has been replaced. While the replacement of the batteries is not completed (NO in S12), the determination of S12 is repeatedly performed.

Upon receiving the exchange-request signal, the server 380 starts S33 process from S31. In S31, the server 380 selects two battery packs from the battery packs (stocks) stored in the first storage device 310 that match the specifications of the vehicle 100 (the battery pack B11, B12 or the specifications of the vehicle body 10) indicated by the replacement request signal. If it is determined that there is no battery pack in stock that matches the specifications of the vehicle 100, the server 380 may cause the display device 390 to display a message for explanation of the situation, and stop the battery replacement process. When the battery pack is selected in S31, the server 380 controls the replacement device 350 so that the battery pack B11, B12 is removed from the vehicle body 10 in a subsequent S32. Accordingly, the vehicle body 10 and the battery-pack B11, B12 are separated from each other.

Although not shown in the flow chart, a reuse process is performed on the removed battery-pack B11, B12. Specifically, the recovery device 330 transfers (collects) the battery-pack B11, B12 from the replacement device 350 to the second storage device 320. Then, the plurality of battery packs stored in the second storage device 320 are sequentially inspected by the inspection device, and the sorting device sorts the battery packs for each use according to the inspection result. Each battery pack is reused in a corresponding application (for vehicle-mounted, stationary, and the like). However, the battery pack that cannot be reused is discarded. The battery pack (for vehicle use) reused in the battery replacement system 300 is transported to the first storage device 310 by the filling device 340. The transported battery pack is filled in the first storage device 310.

In S33, the server 380 controls the chargers of the first storage device 310 so that the batteries 21 of the battery pack B21, B22 selected by S31 are charged. However, the charging timing can be changed as appropriate. The charged battery pack may be filled in the first storage device 310. When the charging is completed, the server 380 controls the supply device of the first storage device 310 so that the battery-pack B21, B22 is conveyed (supplied) from the first storage device 310 to the replacement device 350. Subsequently, the server 380 controls the replacement device 350 so that the battery-pack B21 and B22 are attached to the vehicle body 10. At this time, each SMR 23 of the battery-pack B21, B22 is open. Thereafter, the server 380 transmits a signal indicating completion of the installation of the battery pack (hereinafter, referred to as a "replacement completion signal") to ECU 18a.

FIG. 2 illustrates an example in which removal of the battery pack and attachment of the battery pack are performed at different positions. The vehicle position may be adjusted prior to removal of the battery pack, prior to installation of the battery pack, or both. A conveyance device (for example, a conveyance device of a conveyor type) or a conveyance robot (not shown) may move the vehicle. However, the removal of the battery pack and the attachment of the battery pack may be performed at the same position. The battery pack may be replaced (removed and attached) while the vehicle is stationary. The transport method of each of the recovery device 330, the supply device, and the filling device 340 is also arbitrary. These conveyance methods may be a conveyor method or a method using a conveyance robot. Note that the battery pack (power storage device) may be manually replaced by the user without communication between the battery replacement system (station) and the vehicle.

When the battery pack B21 and B22 are attached to the vehicle body 10, the terminal T11A, T12A of the battery pack B21 is connected to the terminal T21, T22 of the vehicle body 10. The terminal T21, T22 of the battery-pack B22 is connected to the terminal T11B, T12B of the vehicle body 10. As a result, the vehicle body 10 and the battery pack B21, B22 are connected to each other as shown in FIG. 1. By attaching the battery pack B21 and B22 to the vehicle body 10, a low-voltage power supply line (circuit CR12, CR22) and a communication line (communication line CL1, CL2) are connected between the vehicle body 10 and each of the battery pack B21, B22. Then, in each of the battery-pack B21 and B22, S24 process is started from S21 shown in FIG. 3.

In S21, ECU 28a is activated by electric power supplied from a power source (auxiliary battery 17) in the vehicle body 10. Subsequently, in S22, the activated ECU 28a transmits information indicating the state of the battery pack (hereinafter, referred to as "state information") to ECU 18a. The state-information indicates, for example, the voltage of the present battery 21 detected by BMS 22a. The voltage of the battery 21 may vary depending on SOC (State Of Charge) of the battery 21. SOC represents, for example, a ratio of the present amount of stored electricity to the amount of stored electricity in a fully charged state, from 0 to 100%.

Subsequently, ECU 28a determines whether or not a SMR on-command (a S103, S107 of FIG. 4 to be described later) is received from the vehicle body 10 in S23. ECU 28a waits for a SMR on-command from the vehicle body 10 in S23 while keeping SMR 23 open. When ECU 28a receives SMR on-command (YES in S23), in S24, the ECU 28a switches SMR 23 from the open state (shut-off state) to the closed state (connected state).

On the other hand, when the battery-pack B21 and B22 are attached to the vehicle body 10, ECU 18a receives a replacement completion signal (S33) from the server 380. As a result, it is determined that S12 is YES, and the process proceeds to S13. In S13, ECU 18a determines whether the status data is received from ECU 28a of each of the battery-pack B21 and B22. When ECU 18a receives the status information from the respective battery packs (YES in S13), ECU 18a executes the process flow illustrated in FIG. 4 in S14.

Figure 4:
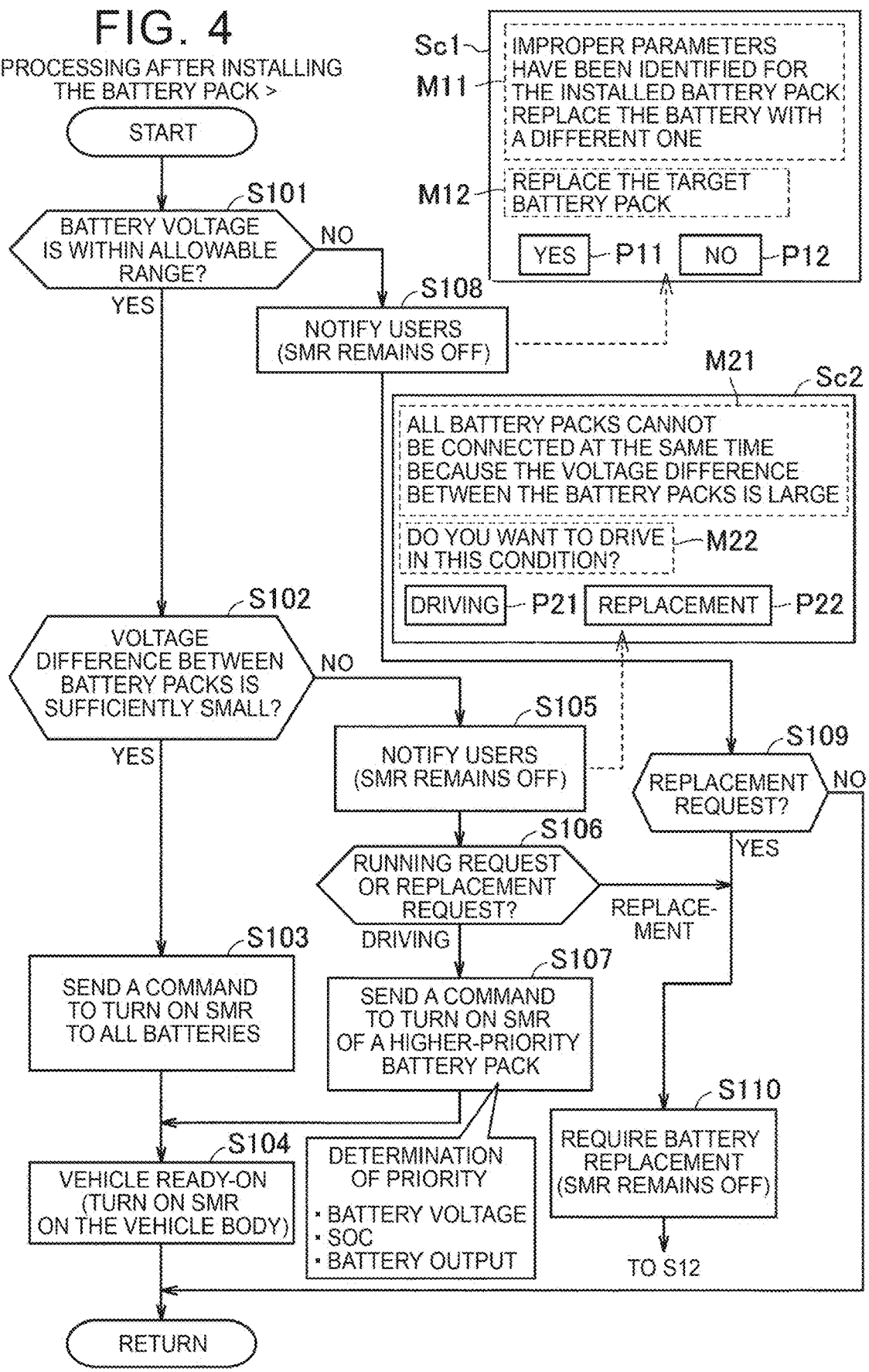
FIG. 4 is a flowchart showing a process executed by a control device in the vehicle body after the power storage device is attached to the vehicle body in the battery replacement method shown in FIG. 3.

FIG. 4 is a flow chart showing a process executed by ECU 18a in the vehicle body 10 after the battery-pack B21 and B22 are attached to the vehicle body 10. Referring to FIG. 4, in S101, ECU 18a determines whether or not the voltage of each battery 21 of the battery pack B21, B22 is within a predetermined range (hereinafter, referred to as an "allowable range") based on the status information (S22 of FIG. 3) acquired from ECU 28a. The allowable range indicates a condition in which each of the battery-pack B21, B22 can operate normally in the vehicle 100, and more specifically corresponds to an appropriate voltage range of the battery 21. The tolerance may be set to match the vehicle drive system (e.g., circuit CR11 and control system) of the vehicle 100.

When the voltage of each battery 21 of the battery pack B21, B22 is within the allowable range (YES in S101), ECU 18a determines whether or not the difference (voltage difference) between the voltage of the battery 21 (first battery) of the battery pack B21 and the voltage of the battery 21 (second battery) of the battery pack B22 is smaller than a predetermined reference value in S102. When the voltage-difference is smaller than the reference value (YES in S102), ECU 18a transmits, in S103, a signal (a SMR on-command) instructing the closing drive of SMR 23 to each of the battery-pack B21, B22. As a result, SMR 23 of the respective battery packs are closed (S24 of FIG. 3). Subsequently, ECU 18a switches SMR 13 from the open state to the closed state by S104. As a result, the vehicle 100 is turned Ready-ON, the battery 21 of each of the battery packs B21, B22 is connected to the inverter 11b, and the voltage of each of the batteries is applied to the inverter 11b. As described above, ECU 18a confirms that, when the battery pack B21 and B22 are attached to the vehicle body 10, the voltage-difference between the two batteries 21 attached to the vehicle body 10 is sufficiently small. Thereafter, ECU 18a connects all of SMR 13 of the vehicle body 10, SMR 23 of the battery pack B21, and SMR 23 of the battery pack B22, and applies the voltages of both of the two batteries 21 connected in parallel to the vehicle drive to the vehicle drive. When S104 process is executed, S14 of FIG. 3 and thus the process flow related to the replacement of batteries are completed. Thereafter, ECU 18a may begin traveling of the vehicle 100 with a plurality of batteries (the batteries 21 of each of the battery packs B21, B22) connected in parallel to the vehicle driving device. When the voltage differential of the plurality of batteries connected to the vehicle driving device becomes larger than the reference value during the traveling of the vehicle 100 or the plug-in charging, ECU 18a may shut off any SMR 23 of the battery pack B21, B22 and disconnect one of the batteries from the vehicle driving device. ECU 18a may also perform control to equalize the storage capacity of the batteries during running of the vehicles 100 or during plug-in charging so that the voltage differential of the batteries is not greater than the reference value.

When the voltage of the battery 21 is not within the allowable range for at least one of the battery packs B21, B22 (NO in S101), ECU 18a notifies the user terminal (for example, HMI 19a) of the vehicle 100 to replace the battery packs in S108. Thereafter, ECU 18a determines, at S109, whether or not it has received a replacement request from the user. Upon receiving the notification of S108, the user terminal displays, for example, a display Sc1. The display Sc1 displays a message M11, M12 and an operation unit P11, P12.

The message M11 prompts the user of the vehicle 100 to replace the battery pack. The message M12 describes the operation unit P11, P12. When the operation unit P11 is operated, it is determined as YES by S109. Then, ECU 18a transmits, in S110, a replacement request signal requesting replacement of the battery pack in which the voltage of the battery 21 is not within the allowable range to the server 380, and then returns the process to S12 of FIG. 3. S33 process flow is started again from S31 shown in FIG. 3 by the replacement request signal. However, in the processing flow, only the battery pack in which the voltage of the battery 21 is not within the allowable range is replaced. On the other hand, when the operation unit P12 is operated, it is determined that S109 is NO, S14 of FIG. 3 ends, and the process flow related to the replacement of batteries ends.

When the voltage difference between the two batteries attached to the vehicle body 10 is equal to or greater than the reference value (NO in S102), ECU 18a notifies the user terminal (for example, HMI 19a) of the vehicle 100 in S105 to select one of traveling and replacement. ECU 18a then determines, at S106, whether the user has selected to run/replace. Upon receiving the notification of S105, the user terminal displays, for example, a display Sc2. The display Sc2 displays a message M21, M22 and an operation unit P21, P22. The message M21 informs the user of the vehicle 100 as well as the reason that all battery packs cannot be used at the same time. The message M22 prompts the user to operate one of the operation unit P21 corresponding to "traveling" and the operation unit P22 corresponding to "replacement".

When the operation unit P22 is operated, it is determined by S106 that "replacement" has been selected, and the process proceeds to S110. In S110, ECU 18a transmits an exchange-request signal to the server 380, and then returns the process to S12 of FIG. 3. ECU 18a may request the server 380 to replace both the battery-pack B21 and B22 according to the replacement request signal. Alternatively, ECU 18a may request the server 380 to replace only the lower-priority battery pack in the battery pack B21, B22. The priorities may be determined in the same manner as S107 described later.

When the operation unit P21 is operated, it is determined by S106 that "running" is selected, and ECU 18a selects, in S107, the battery pack having the higher-priority among the battery pack B21, B22, and transmits a SMR on-command to ECU 28a of the selected battery pack. More specifically, ECU 18a determines the degree of prioritization based on at least one of a voltage, a power storage amount, and a maximum output of the battery 21. ECU 18a may determine that the higher the voltage of the battery 21, the higher the storage capacity of the battery 21, and the higher the maximal power (W) of the battery 21, the higher the priority. ECU 18a may select the higher-voltage battery pack of the battery 21 in S107. Alternatively, ECU 18a may select a battery pack having a larger power of the battery 21 in S107. ECU 18a may select a battery pack having a larger storage capacity of the battery 21 when the maximal power of the battery 21 is the same with respect to the battery pack B21, B22. When the output of the battery 21 (for example, the output current or the output power) is controlled to be equal to or lower than the output upper limit value in the respective battery packs, ECU 18a may consider the output upper limit value as the maximum output.

S107 process closes SMR 23 of the selected battery pack (higher-priority battery pack) (S24 in FIG. 3). Subsequently, ECU 18a switches SMR 13 from the open state to the closed state by S104. As a result, the vehicle 100 is turned Ready-ON, and the battery 21 of the battery pack selected by S107 is connected to the inverter 11b. According to the high-priority battery pack, it is easy to provide the power required for the inverter 11b.

As described above, the battery replacement method according to this embodiment includes the respective processes illustrated in FIGS. 3 and 4. The vehicle 100 according to this embodiment includes a battery pack 20A (battery pack B21) and a battery pack 20B (battery pack B22) that can be connected in parallel to a vehicle drive device (object device). When the voltage difference between the voltage of the battery 21 of the battery pack 20A and the voltage of the battery 21 of the battery pack 20B is larger than the reference value, at least one of the battery 21 of the battery pack 20A and the battery 21 of the battery pack 20B is not connected to the vehicle drive device (inverter 11b). Specifically, when the voltage differential is smaller than the reference value (YES in S102 of FIG. 4), ECU 18a (control device) of the vehicle body 10 connects all of SMR 13 of the vehicle body 10, SMR 23 of the battery pack 20A, and SMR 23 of the battery pack 20B. ECU 18a (control device) of the vehicle body 10 shuts off SMR 23 of at least one of the battery-pack 20A and 20B when the voltage-difference is larger than the reference value (NO in S102 of FIG. 4).

For example, when two batteries having a large voltage difference are connected in parallel to one object device, there is a possibility that an overcurrent flows in the object device. Such an overcurrent may damage the object device. In this regard, according to the above configuration, when the voltage-difference between the two batteries 21 included in the battery pack 20A and 20B is large, at least one of the two batteries 21 is not connected to the object device. This suppresses an overcurrent from flowing through the object device.

Figure 5:
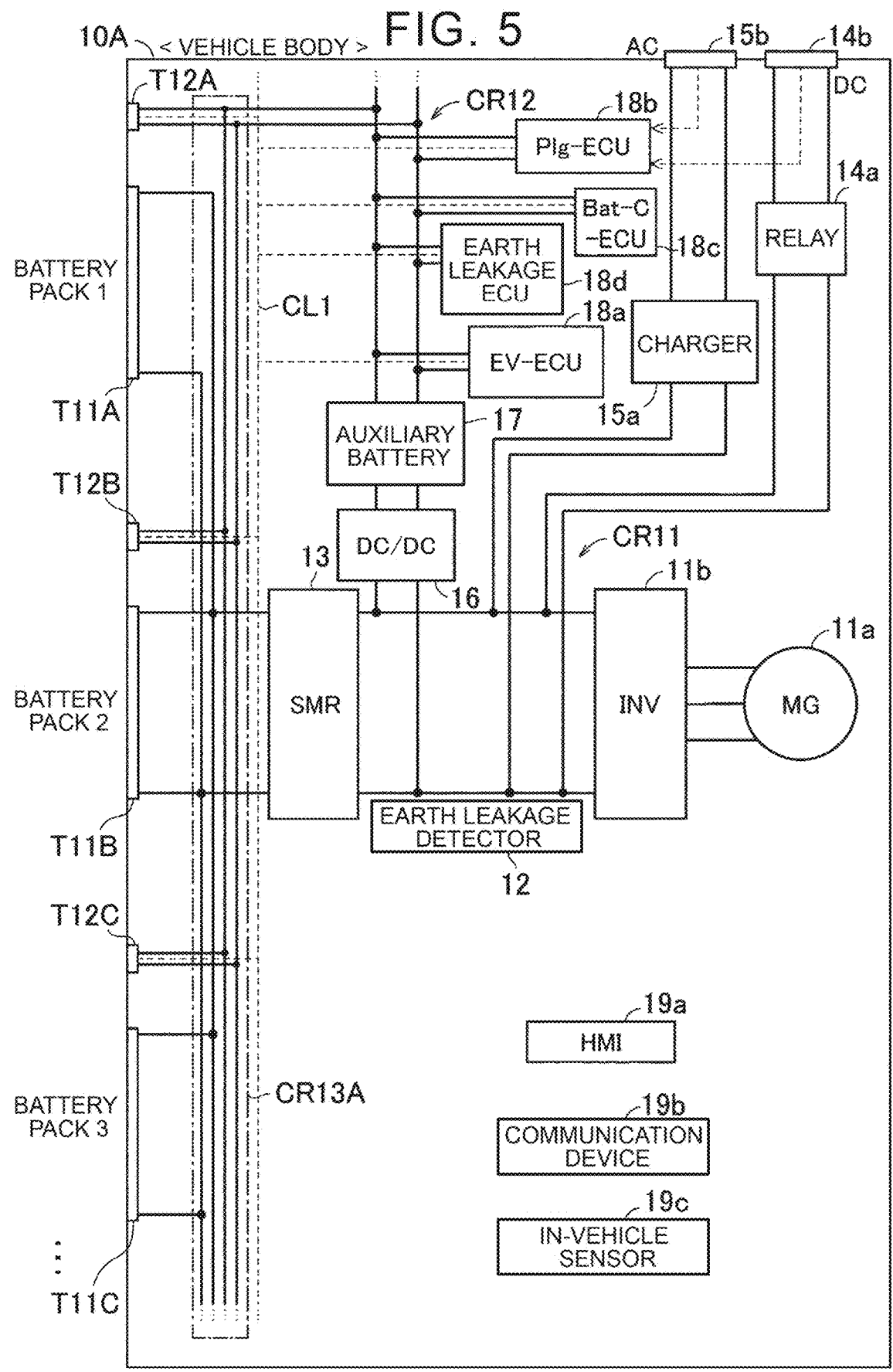
FIG. 5 is a diagram showing a modification of the configuration shown in FIG. 1.

The vehicle body may be configured to be connectable to three or more battery packs (power storage devices). FIG. 5 is a diagram illustrating a modification of the configuration illustrated in FIG. 1. Referring to FIG. 5, the vehicle body 10A includes a terminal T11A, T12A to which the first battery pack can be attached and detached, a terminal T11B, T12B to which the second battery pack can be attached and detached, and a terminal T11C, T12C to which the third battery pack can be attached and detached. The vehicle body 10A is configured to be connectable to at least the first to third battery packs. The vehicle body 10A includes a parallel circuit CR13A instead of the parallel circuit CR13 (FIG. 1). In the parallel-circuit CR13A, a terminal T11A, T11B, T11C (high-voltage power supply line) is connected in parallel, and a terminal T12A, T12B, T12C (low-voltage power supply line) is connected in parallel.

ECU 18a (control device) of the vehicle body 10A can also replace three or more battery packs (power storage devices) by the methods shown in FIGS. 3 and 4. However, in this modification, in S102 of FIG. 4, when a combination of two battery packs (two batteries) is selected from three or more battery packs attached to the vehicle body 10A, it is determined whether or not the voltage differences between all the combinations are smaller than the reference value. ECU 18a according to the modification executes, for example, the process sequence shown in FIG. 6 in S107 of FIG. 4. FIG. 6 is a flowchart illustrating a modification of a method of selecting a battery (battery pack) to be connected to an object device.

Referring to FIG. 6, in S201, ECU 18a determines whether a combination of batteries having a voltage-difference smaller than a predetermined reference value exists for three or more battery packs attached to the vehicle body 10A. Specifically, ECU 18a acquires a voltage difference between two batteries for all combinations of three or more battery packs attached to the vehicle body 10A, and determines whether the voltage difference is smaller than a reference value for each combination of batteries. If there is at least one battery combination whose voltage difference is less than the reference value (YES in S201), ECU 18a selects, by S202, a plurality of battery packs corresponding to the battery combination whose voltage difference is less than the reference value. Then, ECU 18a transmits a SMR on-command to the selected batteries. As a result, SMR 23 of the selected batteries are closed (S24 in FIG. 3). Thereafter, the process proceeds to S104 of FIG. 4.

For example, when the first battery pack including the first battery, the second battery pack including the second battery, and the third battery pack including the third battery are attached to the vehicle body 10A, ECU 18a acquires a voltage difference between the first battery and the second battery (first combination), a voltage difference between the first battery and the third battery (second combination), and a voltage difference between the second battery and the third battery (third combination). Each of the first to third battery packs has the same configuration as the above-described battery pack 20, and each of the first to third batteries corresponds to the battery 21 in the corresponding battery pack.

When only the voltage-difference of one of the first to third combinations is smaller than the reference value, a SMR on-command is transmitted to each of the two battery-packs corresponding to the combination. When the voltage difference of each of the two combinations of the first to third combinations is smaller than the reference value, a SMR on-command is transmitted to each of the two battery packs corresponding to one combination selected from the two combinations. At this time, a combination including the batteries having the higher priorities (see S107 of FIG. 4) may be selected. When the voltage difference between the first to third combinations is smaller than the reference value, it is determined that the voltage difference is YES in S102 of FIG. 4, and a SMR on-command is transmitted to each of the first to third battery packs in a subsequent S103.

On the other hand, if there is no battery combination with a smaller voltage-difference than the reference (NO at S201), the process proceeds to S203. For example, in a case where the first to third battery packs are attached to the vehicle body 10A, and in a case where the voltage differences between the first to third combinations are equal to or greater than the reference value, the process proceeds to S203. ECU 18a selects one battery pack having the highest precedence (see S107 in FIG. 4) from among three or more battery packs attached to the vehicle body 10A in S203. Then, ECU 18a transmits a SMR on-command to ECU 28a of the selected battery pack. As a result, SMR 23 of the selected battery pack is closed (S24 of FIG. 3). Thereafter, the process proceeds to S104 of FIG. 4.

When three or more battery packs are attached to the vehicle body 10A, ECU 18a (control device) according to the above-described modification acquires the voltage-difference between the two batteries for all combinations of the three or more battery packs. ECU 18a (control device) connects a combination of batteries having a voltage difference smaller than the reference value to the object device (inverter 11b) (S202), and does not connect a combination of batteries having a voltage difference larger than the reference value to the object device (inverter 11b) (S202, S203). According to such a configuration, by not connecting a combination of batteries having a voltage difference larger than the reference value to the object device, it is possible to suppress an overcurrent from flowing in the object device. Further, by connecting a combination of batteries having a voltage difference smaller than the reference value to the object device, for example, electric power necessary for traveling of the vehicle can be easily supplied to the object device.

The processing flows shown in FIGS. 3, 4, and 6 can be changed as appropriate. For example, S101 and subsequent steps may be omitted in the process illustrated in FIG. 4. Further, the process (from S105 to S107, S110) when the voltage difference between the two batteries attached to the vehicle body is larger than the reference value may be changed to another process (however, at least one of the two batteries having the voltage difference larger than the reference value is not connected to the object device).

The configuration of the vehicle body shown in FIG. 1 can be changed as appropriate. For example, SMR 13 may be omitted. In addition, at least one of DC inlet 14b and AC inlet 15b may be omitted, or may be changed to one inlet shared by AC/DC. These inlets may be configured to be capable of bidirectional power transfer. The vehicle body may perform an external power supply (V2X: Vehicle to Everything) using the electric power outputted from the attached battery pack. The object device is not limited to the vehicle driving device, and may include a discharger and/or a discharge relay for external power supply.

The configuration of the battery pack shown in FIG. 1 can be changed as appropriate. For example, the battery pack 20 may further include a battery temperature adjustment device driven by electric power from the auxiliary battery 17. Battery pack 20 may have a power supply for ECU 28a. It is not essential that a plurality of battery packs (power storage devices) included in the vehicle have the same configuration, and may have different configurations. The power storage device is not limited to a battery pack, and may have a packless structure.

The user terminal is not limited to an in-vehicle HMI, and may be a mobile terminal carried by a vehicle user. Examples of mobile terminals include smart phones, laptops, portable game consoles, wearable devices, and electronic keys. The vehicle is not limited to a passenger car, and may be a bus, a truck, or a working vehicle (e.g., a tractor, a combine, or a forklift). The vehicle may be configured to be able to travel unmanned by automatic driving or remote driving.

Various modifications described above may be implemented in any combination.

The embodiment disclosed herein should be considered as illustrative and not restrictive in all respects. The scope of the present disclosure is shown by the claims rather than the above embodiment, and is intended to include all modifications within the meaning and the scope equivalent to those of the claims.

What is claimed is:
1. A vehicle, comprising:
a vehicle body including a processor and an object device;
a first power storage device including a first battery that is electrically connected in parallel to the object device in a state where a first relay is closed, the first relay being provided in the first power storage device; and
a second power storage device including a second battery that is electrically connected in parallel to the object device in a state where a second relay is closed, the second relay being provided in the second power storage device, wherein
the processor is configured to
acquire status information of the first battery and the second battery, determine whether a voltage of each of the first battery and the second battery is within a predetermined range based on the status information, acquire a voltage difference between the voltage of the first battery and the voltage of the second battery in response to a determination that the voltage of each of the first battery and the second battery is within the predetermined range, determine whether the voltage difference is smaller than a reference value, close the first relay and the second relay in response to a determination that the voltage difference is smaller than the reference value, output a first notification to a terminal device operated by a user, in response to a determination that the voltage difference is equal to or greater than the reference value, receive a first request for travel of the vehicle, the first request being made on the terminal device in response to the first notification, select one of the first battery and the second battery based on the voltage, a storage amount, and a maximum output of each of the first battery and the second battery, in response to receiving the first request, and close a corresponding one of the first relay and the second relay to the selected one of the first battery and the second battery.

2. The vehicle according claim 1, wherein the vehicle body further includes
   a first terminal to which the first power storage device is detachably attachable,
   a second terminal to which the second power storage device is detachably attachable, and
   a parallel circuit connecting the first terminal and the second terminal in-parallel; parallel,
the first power storage device further includes a third terminal that is connectable to the first terminal,
the second power storage device further includes a fourth terminal that is connectable to the second terminal,
the first relay is disposed between the third terminal and the first battery, and
the second relay is disposed between the fourth terminal and the second battery.

3. The vehicle according to claim 1, further comprising one or more third power storage devices, wherein each of the one or more third power storage devices includes a third battery and a third relay and is connected in parallel to the object device in a state where the third relay is closed, and the processor is configured to
   acquire a voltage difference between two batteries in each pair of power storage devices among a plurality of power storage devices, the plurality of power storage devices including the first power storage device, the second power storage device, and the one or more third power storage devices,
   close relays included in pairs of power storage devices each of which the voltage difference between batteries is smaller than the reference value, and
   disconnect relays included in pairs of power storage devices each of which the voltage difference between batteries is greater than the reference value.

4. The vehicle according to claim 1, wherein the processor is further configured to
   output a second notification to the terminal device in response to a determination that the voltage of at least one of the first battery and the second battery is not within the predetermined range, the second notification indicating a message to request permission to replace at least one of the first battery and the second battery of which the voltage is not within the predetermined range,
   receive the permission, the permission being made on the terminal device in response to the second notification, and
   transmit a signal to a server outside the vehicle in response to the permission, the signal requesting a replacement of at least one of the first battery and the second battery of which the voltage is not within the predetermined range.

5. The vehicle according to claim 1, wherein the processor is further configured to
   receive a second request for a replacement of the first battery and the second battery, the second request being made on the terminal device in response to the first notification, and
   transmit a signal to a server outside the vehicle in response to receiving the second request, the signal requesting the replacement of the first battery and the second battery.

* * * * *